Jan. 19, 1932.   W. S. EATON   1,842,344
DEVICE FOR MEASURING ELECTRICAL ENERGY
Filed Oct. 22, 1929   2 Sheets-Sheet 1

INVENTOR
By WARREN S. EATON

ATTORNEY

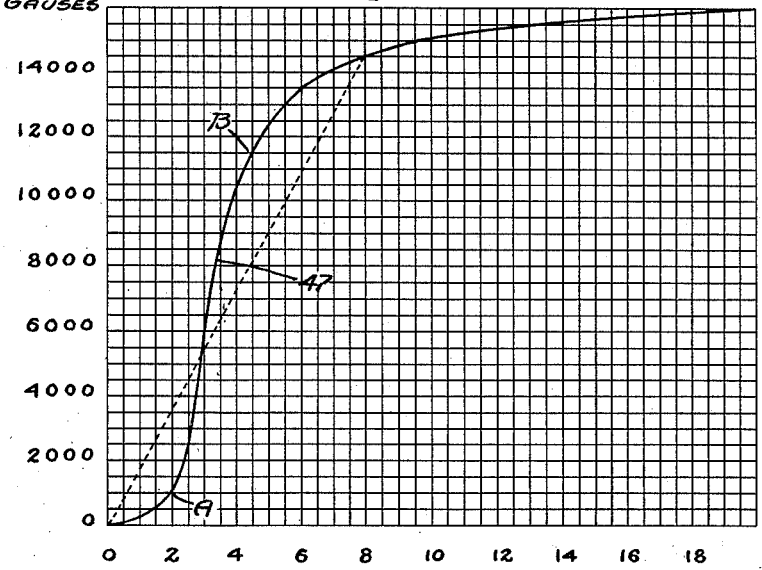
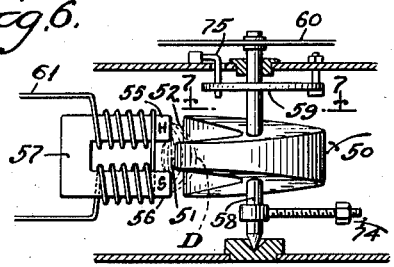
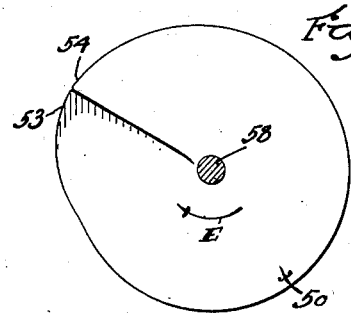
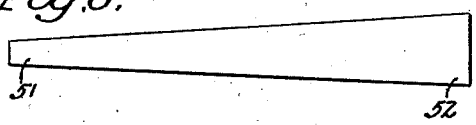
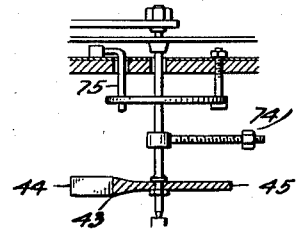
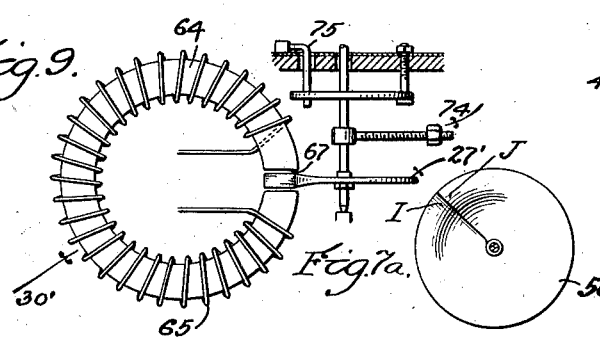

Patented Jan. 19, 1932

1,842,344

UNITED STATES PATENT OFFICE

WARREN S. EATON, OF LOS ANGELES, CALIFORNIA, ASSIGNOR TO EATON RADIO INSTRUMENT CORPORATION, OF LOS ANGELES, CALIFORNIA, A CORPORATION OF CALIFORNIA

DEVICE FOR MEASURING ELECTRICAL ENERGY

Application filed October 22, 1929. Serial No. 401,420.

This invention has to do with instruments for measuring electricity, and is more particularly related to voltmeters and ammeters. The device contemplated by this invention, like the simple type of rotating coil ammeter, can be used for measuring either voltage or current, depending upon whether the instrument is placed across or in the circuit carrying the current to be measured. For this reason, I will refer to the instrument throughout the specifications as being an ammeter, although the device can, by using induction capacity or resistance shunts, be used to measure either voltage or amperage from very small values to very large values.

It is the primary object of this invention to produce an ammeter having several advantages over the common forms now in use. The principal advantage contemplated by this invention resides in the fact that this ammeter may be used to measure either alternating or direct current. The usual type of swinging coil and permanent magnet ammeter, ordinarily known as a direct current ammeter, cannot be used for measuring alternating current.

It is a further object of this invention to produce an ammeter which is especially adapted for use in connection with radio circuits, and since the instrument can be made very compact and very light, and can be operated in any position, it is particularly adapted for use in connection with aeronautical radio direction indicators.

It is a further object of this invention to produce an instrument in which the scale divisions are of equal length and may be carried through substantially 360°. In the usual type of ammeter, the needle swings through an arc of 90°, and in the thermo and thermocouple types of ammeter, the scale divisions must, in view of the varying relation between the thermal expansion of metals and the current flowing therethrough, be crowded at the lower end of the scale. It is of great advantage, therefore, in obtaining accurate and dependable readings to have an instrument in which the indicator will swing through substantially 360°, and in which the scale divisions are of equal magnitude throughout the length of the scale.

The general construction of the ammeter contemplated by this invention comprises a single electromagnet which is arranged so as to be conveniently connected in or across the circuit carrying the current to be measured. A novel type of rotor is associated with this electromagnet and is so designed as to be swung upon a suitable pivot by the magnetic flux established across the pole gap of the electromagnet. The rotor is carried upon a rotatable pivot pin, the upper end of which is provided with an indicator which cooperates with a dial to indicate either the voltage or amperage of the current, depending upon whether or not the instrument is connected "across" or "in" the circuit. The pivot pin or rotor shaft is also provided with a hair spring which is adapted to resist the rotation of the pivot pin and is made of a predetermined strength so that the resisting torque of the hair spring is such that the rotation of the pivot pin is proportional to the flux density in the pole gap.

It is well known to those familiar with the art that the flux density created by an electromagnet is not directly proportional to the magnetizing force but varies depending upon the permeability of the material comprising the electromagnetic circuit. Information regarding the nature of this variation can readily be obtained for various metals and is usually found in the form of curves commonly known as the B. & H. curve for the particular material in question.

It is important, therefore, in order that the scale divisions may be made equal throughout the length of the scale in the instrument contemplated by this invention to provide means for automatically correcting the rotation or swing of the rotor to compensate for this variation between flux density and the magnetizing force. The preferred manner of obtaining this result is to make the rotor of varying cross-sectional area, i. e., varying circumferential thickness, or of varying radii or varying circumferential thickness and varying radii. It is necessary in order that the rotor will be moved by the flux across the pole gap, to make the rotor of varying cross sectional area. The correction mentioned above may be obtained by placing additional variations in the radii or the thickness at the proper points, or by making the rotor of a uniformly varying radii and placing variations in the circumferential thickness in the proper positions as will be hereinafter more fully explained.

It is a further object of this invention to produce an instrument of the class described which utilizes practically the entire magnetic effect of the current to be measured so that the instrument will give accurate readings for very large and very small values. The leakage field is very small since material of high magnetic permeability comprises the entire magnetic circuit.

It is a noteworthy feature of the invention that no stops are required for the needle and the usual slamming of the needle which is a frequent source of damage in the ordinary instruments is thereby avoided.

The details in the construction of the preferred form of my invention, together with other objects attending its production, will be better understood from the following description and the accompanying drawings which are chosen for illustrative purposes only, and in which Fig. 1 is an elevational section taken through a preferred form of my invention;

Fig. 2 is a plan section which may be considered as having been taken in a plane substantially along the line 2—2 in Fig. 1;

Fig. 3 is a partial plan section taken in a plane represented by the line 3—3 in Fig. 1 and showing the manner in which the hair spring may be attached to the pivot shaft;

Fig. 4 is a perspective view showing one form of core member or solenoid support which may be used in connection with that form of my invention shown in Fig. 1;

Fig. 5 is a partial sectional elevation showing a form of rotor which has both a variable radii and a variable circumferential thickness, and may be considered as having been taken in the plane substantially as indicated by the line 5—5 of Fig. 2;

Fig. 6 is a fragmental elevation, showing a modified form of electromagnet and rotor embodying the principle of my invention;

Fig. 7 is a plan view of the rotor shown in Fig. 6 and may be considered as having been taken substantially in a plane represented by the line 7—7 in Fig. 6;

Fig. 7a is a plan view of a modified form of rotor for use in connection with the construction shown in Fig. 6.

Fig. 8 is a diagrammatic view showing the development of the circumference of the rotor shown in Figs. 6 and 7.

Fig. 9 is an elevational view showing a modified form of electromagnet which may be used in combination with that form of my invention shown in Figs. 1 and 2;

Fig. 10 is a diagram or graph, showing the relation between the flux density and the magnetizing force for a common form of magnetic material known as Norway iron. This figure also illustrates in dotted lines the relation between the flux density and the force tending to produce rotation in the rotor which results from the variations in the air gap caused by varying the radii or the thickness of the rotor in the proper location;

Fig. 11 is a partial sectional elevation of a modified form of rotor; and

Fig. 12 is a plan view taken substantially in a plane represented by the line 12—12 in Fig. 11.

Fig. 13 is a view showing the development of the form of rotor shown in Fig. 7a.

More particularly describing the invention as herein illustrated, reference numeral 11 indicates an instrument case which is provided with a base 12, an upper diaphragm or dial plate 13, and a cover glass 14. A bearing block 15 is mounted upon the base member 12 and is provided with an adjustable bearing 16 which supports the lower end of the pivot pin or rotor shaft 17. The upper end of the rotor shaft 17 extends through an opening 18 formed in the diaphragm 13 and is provided with an indicator or needle 20 which is rigidly mounted thereon. The top of the rotor shaft 17 may be supported in any suitable type of bearing such as indicated by reference numeral 21. Bearing 21 is shown as being mounted in the outer end of a bracket or arm 22 which is secured to the wall of the casing as indicated at 23.

The rotor shaft 17 carries a rotor 27 which is rigidly mounted thereon and is made in the form of a plate having a spiral shape so as to provide the variable radii mentioned above. The outline of the plate is perhaps best illustrated in Fig. 2 and it will be noted from both Figs. 1 and 2 that the plate is positioned so that its outer edge lies in a plane between the two opposite faces of poles 28 and 29 of the electromagnet generally indicated by reference numeral 30.

In the form of the invention shown in Figs. 1 to 4 inclusive, the electromagnet 30 comprises a U-shaped core block or solenoid support 31 which is secured in the case 11 by means of bolts 32 and a cross plate 33. An induction coil or solenoid coil 34 is positioned upon the pole 29 and is provided with conductors 35 and 36 which are connected to suitable contact posts 37 and 38 preferably located upon the outer surface of the casing 11. The lower pole 28 of the solenoid core block 31 is shown as comprising a block which is mounted upon the lower section 28' of the horseshoe shaped core member 31. This construction facilitates the assembly of the unit and provides a very narrow pole gap 40 within which the rotor plate oscillates, and forms what is in effect a horseshoe magnet when current is flowing through the induction coil 34.

Assuming for the time being that the flux density in an electro magnet is directly proportional to the magnetizing force, it will be apparent that when a given current is flowing through the coil 34 the magnetic force established by the flux flowing across the pole gap 40 will be effective to attract the rotor plate 27 in the direction of the arrow A, shown in Fig. 2, so that the largest possible cross sectional area occupies the pole gap. The movement of the plate caused by such attraction is, however, opposed by the torque in a hair spring 41 and this opposition is of a predetermined character which permits the rotor to be moved theoretically, in direct proportion to the current flowing through the coil 34.

It was previously pointed out, however, that the flux density was not directly proportional to the magnetizing force but varied with the permeability of the material forming the magnetic circuit. This variation for a standard magnetic material known as Norway iron is illustrated by the curves shown in Fig. 10, where it will be noted that from the region indicated at A to the region indicated at B the flux density varies almost directly with the magnetizing force, but that from the starting point of the curve to the point A and beyond the point B, the magnetizing force necessary to produce a change in flux density is much greater than it is between the points A and B. The correction of this variation is accomplished by varying the air gap between the pole faces at those points on the rotor which occupy the air gap for low current measurement and for high current measurement, respectively. This variation is, perhaps, best illustrated in Fig. 5 where it will be noted that the short or leading portion 43 and the long or trailing portion 44 are of much greater thickness than the portion 45 of the rotor which lies in the pole gap during the greater part of its rotation. A similar effect might also be obtained by placing additional variations in the radii of the rotor at these points, as indicated at points F and G in Figs. 11 and 12. The design of this rotor can be readily calculated and laid out for the particular material from which the rotor and the solenoid core are constructed, and it will be readily apparent that when the thick portion 43 (Figs. 1 and 2) or the enlarged portion F (Fig. 12) lies in the pole gap 40, a flux density of less magnitude is required to produce a unit of rotation than is the case when the portion 45 lies in the pole gap. A similar action will occur when the section 44 (Figs. 1 and 2) or section G (Fig. 12) lies in the pole gap, so that the effective force tending to produce rotation in the rotor is the same for all current values lying along the curve 47 in Fig. 10.

Figs. 6 to 8, inclusive, show a modified form of my invention, in which the rotor 50, instead of being made in the form of a spiral-shaped plate, is made in the form of a substantially cylindrical block of gradually increasing peripheral thickness, so that the leading edge 51 is more narrow than the trailing portion 52. This block is provided with enlarged portions or projections of increased diameter, indicated at 53 and 54, which are positioned at the leading and trailing portions of the circumference of the rotor, respectively, and are so formed as to reduce the air gap between the poles 55 and 56 of a horseshoe electromagnet 57. The rotor 50 is mounted upon a rotor shaft or pivot pin 58, which is similar to the pivot pin 17 described in connection with Fig. 1, and is provided with a hair spring 59 and a needle 60. In the operation of this form of my invention, it will be understood that when the instrument is introduced into an electric circuit in a manner such that current flows through the conductor 61, a magnetic field is induced at the end of the horseshoe magnet 57, the magnetic lines of force flowing between the poles in the manner indicated by the dotted lines D. This magnetic field of force attracts the rotor in a manner such that the region of large circumferential thickness is drawn toward the magnet in the direction of the arrow E in Fig. 7. This rotative movement of the rotor is opposed by the hair spring 59, which is adjusted so that the movement of the rotor is directly proportional to the magnitude of the current exciting the electromagnet 57.

Fig. 8 is a development of the rotor shown in Figs. 6 and 7, and illustrates the manner in which the circumferential thickness gradually increases from the leading portion 51 to the trailing portion 52.

In the modification shown in Fig. 7a, the rotor 50' is made cylindrical in shape, but the correction for the B-H variation is taken care of by variation in peripheral thickness, as indicated in Fig. 13.

Fig. 9 shows another modified form of the invention, which is similar to the form shown in Figs. 1 to 4, inclusive, but in which the electromagnet 30' is made in the form of a notched or split ring 64, provided with a coil winding 65 and having a pole gap 67 formed in the notch or split of the ring. The rotor 27' is similar in its construction and operation to the rotor 27 described in connection with Figs. 1 to 4, inclusive.

I consider it preferable to provide the rotor shaft in all forms of my invention with a balance, such as the balance arm indicated at 74 in all of the figures. The hair spring should be provided with a tension adjustment, as indicated at 75.

It will be apparent from the foregoing description that this invention comprises an instrument which is of simple form and construction and may be economically manufactured; further, that the instrument may be operated in any position and that the construction of the rotor and its associated parts are such that the needle will be swung through an arc of substantially 360°, the scale divisions of which can be made equal, so that the same instrument may be used for measuring electric current values of very small and very large magnitude.

With regard to the scale divisions, it will be understood that when the rotor is made of uniformly varying cross sectional area, the scale divisions must be varied to compensate for the variation between the flux density and the magnetizing force. It will be understood, therefore, that the movement of the rotor will, in all events, bear a predetermined relation to the magnetizing force, and that, while it is preferable to vary the radii or the thickness of the rotor to take care of the B-H variation, the instrument is operable (with unequal scale divisions) when the rotor has a uniformly varying cross sectional area, so as to rotate in direct proportion to the flux density.

It will also be apparent to those familiar with the art that, since the rotor is moving transversely through the flux in all cases, its operation is entirely independent of the type of current producing the magnetic field. In other words, the instrument will operate equally well with alternating or direct current.

It is to be understood that, while I have herein described and illustrated one preferred form of the invention, and suggested certain modifications thereof, the invention is not limited to the precise construction as set forth, but includes within its scope whatever changes fairly come within the spirit of the appended claims.

I claim as my invention:

1. A device for measuring electrical current embodying: a substantially flat rotor of variable cross sectional area; an electromagnet having a pole face above and below said rotor near the periphery thereof; yieldable means for retarding the movement of said rotor; and an indicator associated with said rotor for indicating the relative magnitude of the electrical current exciting said electromagnet.

2. A device for measuring an electrical current embodying: a substantially flat rotor of variable radii; an electromagnet having a pole face above and below said rotor near the periphery thereof; yieldable retarding means adapted to permit the movement of said rotor in predetermined relation to the flux density created by said electromagnet; and an indicator associated with said rotor for indicating the relative magnitude of the electrical current exciting said electromagnet.

3. A device for measuring electrical current embodying: a rotor of varying circumferential thickness; an electromagnet having a pole face above and below said rotor near the circumference thereof; yieldable means for retarding the movement of said rotor; and an indicator associated with said rotor for indicating the relative magnitude of the electrical current exciting said electromagnet.

4. A device for measuring electrical current embodying: a rotor of varying radii and varying circumferential thickness; an electromagnet having a pole above and below said rotor near the circumference thereof; yieldable means for retarding the movement of said rotor; and an indicator associated with said rotor for indicating the relative magnitude of the electrical current exciting said electromagnet.

In testimony whereof, I have hereunto set my hand at Dayton, Ohio, this 8th day of October, 1929.

WARREN S. EATON.